United States Patent
Hemphill et al.

(10) Patent No.: US 9,151,333 B2
(45) Date of Patent: Oct. 6, 2015

(54) GAP-FILLING CLUTCH WITH RAMPS

(71) Applicant: Schaeffler Technologies AG & Co. KG, Herzogenaurach (DE)

(72) Inventors: Jeffrey Hemphill, Copley, OH (US); Philip George, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/103,208

(22) Filed: Dec. 11, 2013

(65) Prior Publication Data

US 2014/0174878 A1    Jun. 26, 2014

Related U.S. Application Data

(60) Provisional application No. 61/740,805, filed on Dec. 21, 2012.

(51) Int. Cl.
*F16D 13/54* (2006.01)
*F16D 25/0638* (2006.01)
*F16D 13/42* (2006.01)
*F16D 23/12* (2006.01)

(52) U.S. Cl.
CPC ............ *F16D 13/54* (2013.01); *F16D 25/0638* (2013.01); *F16D 13/42* (2013.01); *F16D 2023/123* (2013.01)

(58) Field of Classification Search
CPC ....................................................... F16D 13/42
USPC .............................................. 192/85.26, 85.5
See application file for complete search history.

(56) References Cited

U.S. PATENT DOCUMENTS

| 2,977,817 | A | | 4/1961 | Panasewicz | |
|---|---|---|---|---|---|
| 3,511,349 | A | * | 5/1970 | Herscovici | 192/56.31 |
| 5,593,016 | A | * | 1/1997 | Murata et al. | 192/85.26 |
| 5,992,597 | A | * | 11/1999 | Nagai et al. | 192/85.34 |
| 6,805,228 | B2 | | 10/2004 | Szadkowski et al. | |
| 2001/0011622 | A1 | * | 8/2001 | Arai et al. | 192/35 |

* cited by examiner

*Primary Examiner* — Ramya Burgess
*Assistant Examiner* — Mark Manley
(74) *Attorney, Agent, or Firm* — Simpson & Simpson, PLLC

(57) ABSTRACT

A transmission clutch including: a carrier; a clutch pack; friction plates; a compression plate including a portion; and a first ramp ring including: a first portion in contact with the portion of the compression plate; and a second portion. The clutch includes a second ramp ring including a third portion axially aligned with the second portion; a lever spring; and a piston. The piston displaces the spring in an axial direction such that: the spring applies a force to the second portion; the first ramp ring rotates in a circumferential direction and axially displaces in the axial direction; and the first ramp ring urges the compression plate in the axial direction to contact the clutch pack. The piston displaces the lever spring further in the axial direction such that the compression plate clamps pressure plates and friction plates in the clutch pack to rotationally fix the carrier to the housing.

16 Claims, 7 Drawing Sheets

GAP-FILLING CLUTCH WITH RAMPS

CROSS-REFERENCE TO RELATED APPLICATIONS

This application claims the benefit under 35 U.S.C. §119 (e) of U.S. Provisional Patent Application No. 61/740,805, filed Dec. 21, 2012, which application is incorporated herein by reference in its entirety.

TECHNICAL FIELD

The present disclosure relates to a clutch with means for reducing clutch drag while maintaining operating speed of the clutch. Specifically, pressure and friction plates and a compression plate for closing the clutch are separated by respective gaps and a configuration of plates and ramps enables the gaps to be quickly closed when closing the clutch.

BACKGROUND

In general, clutches have two objectives: to transmit full torque when closed and to transmit no torque when open. The prior art teaches wet clutches with clutch drag from frictional contact between rotating components of the clutch such as a piston, pressure plates, and friction plates, when open. The clutch drag reduces the efficiency of a component, such as a transmission, including the clutch. The prior art teaches reducing such clutch drag by separating a piston, pressure plates, and friction plates by greater respective amounts. However, the prior art also teaches that greater amounts of hydraulic fluid are needed to displace the separated elements, increasing the time needed to close the clutch. For example, if the piston is located further from the pressure plates, more fluid is needed to displace the piston the further distance. The above options create a conflict between fuel economy (reduced by clutch drag) and acceptable driveability (response time for closing the clutch).

There are other problems associated with reducing clutch drag by increasing gaps in the clutch. When using a fixed lever or hydraulic ratio to engage a clutch, it becomes difficult to find the touch point (when torque begins to be transmitted) when attempting to close the increased gaps quickly. The difficulty in finding the touch point may result in either slow shift times or rough shifts. Furthermore, clutch drag is often exacerbated in the case of wet clutches in order to control tolerances in fabrication. That is, because a smaller lift-off gap is easier to control, gaps between components in the clutch are even further reduced. Variable ratio mechanisms have been proposed; however, such mechanisms have problems with complexity, friction, or are difficult to apply to rotating clutches.

SUMMARY

According to aspects illustrated herein, there is provided a clutch for a transmission, including: an inner carrier; a clutch pack including plurality of pressure plates non-rotationally connected to one of the inner carrier or a housing for the transmission and a plurality of friction plates non-rotationally connected to the other of the inner carrier or the housing; a compression plate including a first portion; and a first ramp ring including a second portion in contact with the first portion and a third portion. The clutch includes: a second ramp ring including a fourth portion axially aligned with the third portion; a lever spring; and an axially displaceable piston. The piston is arranged to axially displace the lever spring a first distance in a first axial direction such that: the lever spring applies a first force to the third portion in the first axial direction; the first ramp ring rotates in a first circumferential direction and axially displaces in the first axial direction; and the first ramp ring displaces the compression plate in the first axial direction to contact a portion of the clutch pack. The piston is arranged to further displace the lever spring in the first axial direction such that the compression plate displaces further in the first axial direction and the plurality of pressure plates frictionally engages the plurality of friction plates to rotationally fix the inner carrier with respect to the housing.

According to aspects illustrated herein, there is provided a clutch for a transmission, including: an inner carrier; a clutch pack including plurality of pressure plates non-rotationally connected to one of the inner carrier or a housing for the transmission and a plurality of friction plates non-rotationally connected to the other of the inner carrier or the housing; a compression plate including a first portion; a first ramp ring including second and third portions; a second ramp ring including a fourth portion; and a first ramp assembly including the first portion of the compression plate including a first plurality of ramps and the second portion of the first ramp ring including a second plurality of ramps in contact with the first plurality of ramps. The clutch includes a second ramp assembly including: the third portion of the first ramp ring including a third plurality of ramps and the fourth portion of the second ramp ring including a fourth plurality of ramps in contact with the third plurality of ramps; or the third portion of the first ramp ring including a third plurality of ramps or a first radial surface, the fourth portion of the second ramp ring including a fourth plurality of ramps or a second radial surface, and a plurality of spheres or rollers axially disposed between the third and fourth portions and in contact with the third and fourth portions. The clutch includes a lever spring and an axially displaceable piston. The piston is arranged to axially displace the lever spring a first distance in a first axial direction such that: the lever spring applies a first force to the third portion in the first axial direction; the first ramp ring rotates in a first circumferential direction and axially displaces in the first axial direction; and the first ramp ring displaces the compression plate in the first axial direction to contact a portion of the clutch pack. The piston is arranged to further displace the lever spring in the first axial direction such that the compression plate displaces further in the first axial direction and the plurality of pressure plates frictionally engages the plurality of friction plates to rotationally fix the inner carrier with respect to the housing.

According to aspects illustrated herein, there is provided a clutch for a transmission, including: an inner carrier; a clutch pack including a plurality of pressure plates non-rotationally connected to one of the inner carrier or a housing for the transmission and a plurality of friction plates non-rotationally connected to the other of the inner carrier or the housing; a compression plate; a first ramp ring; a second ramp ring non-rotatably connected to the housing; and a first ramp assembly including: a first portion of the compression plate including a first plurality of ramps; and a second portion of the first ramp ring including a second plurality of ramps in contact with the first plurality of ramps. The clutch includes: a second ramp assembly including: a third portion of the first ramp ring including a third plurality of ramps or a first radial surface; a fourth portion of the second ramp ring including a fourth plurality of ramps or a second radial surface; and a plurality of spheres or rollers axially disposed between the third and fourth portions and in contact with the third and fourth portions; a lever spring; a first spring urging the first ramp ring in a first circumferential direction with respect to the second ramp ring; a second spring urging the compression plate in a first axial direction with respect to the inner carrier; and an axially displaceable piston. When the clutch is open the compression plate is free of contact with the plurality of pressure plates and the plurality of friction plates. The piston is arranged to axially displace the lever spring a first distance in a first axial direction such that: the lever spring applies a first force to the second ramp assembly in the first axial direction; the third portion rotates in a first circumferential direction and axially displaces in the first axial direction; and the second portion displaces the compression plate in the first axial direction to contact a portion of the clutch pack. The piston is arranged to further displace the lever spring in the first axial direction such that the compression plate displaces further in the first axial direction and the plurality of pressure plates frictionally engages the plurality of friction plates to rotationally lock the inner carrier to the housing. The piston is displaceable in the second axial direction such that: the first spring displaces the first ramp ring in the first circumferential direction with respect to the second ramp ring; and the first ramp ring and the compression plate displace in the first axial direction such that the compression plate is free of contact with the clutch pack.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
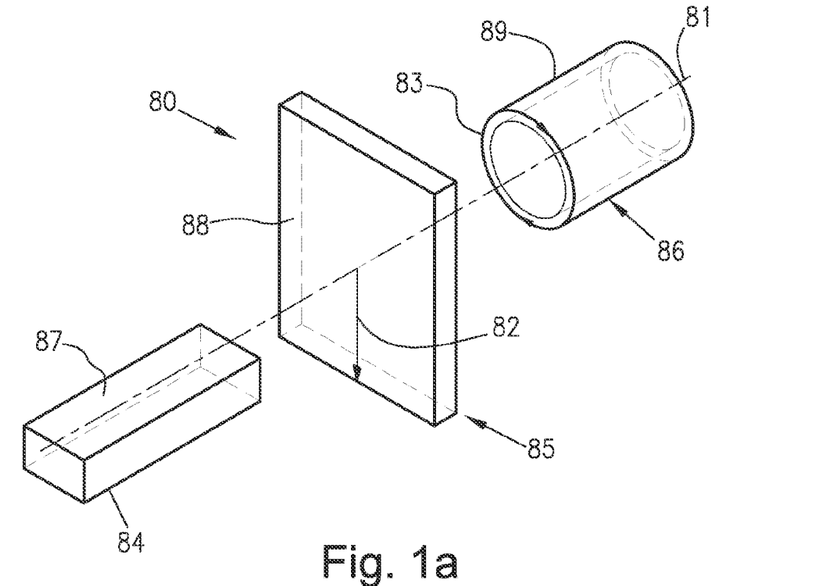
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
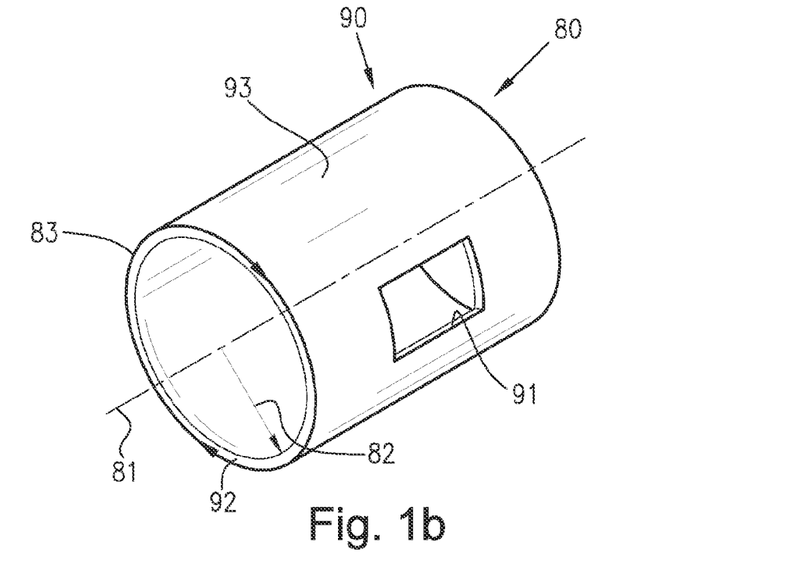
FIG. 1B is a perspective view of an object in the cylindrical coordinate system of FIG. 1A demonstrating spatial terminology used in the present application; and, FIG. 2 is a partial cross-sectional view of a gap-filling clutch with ramps.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
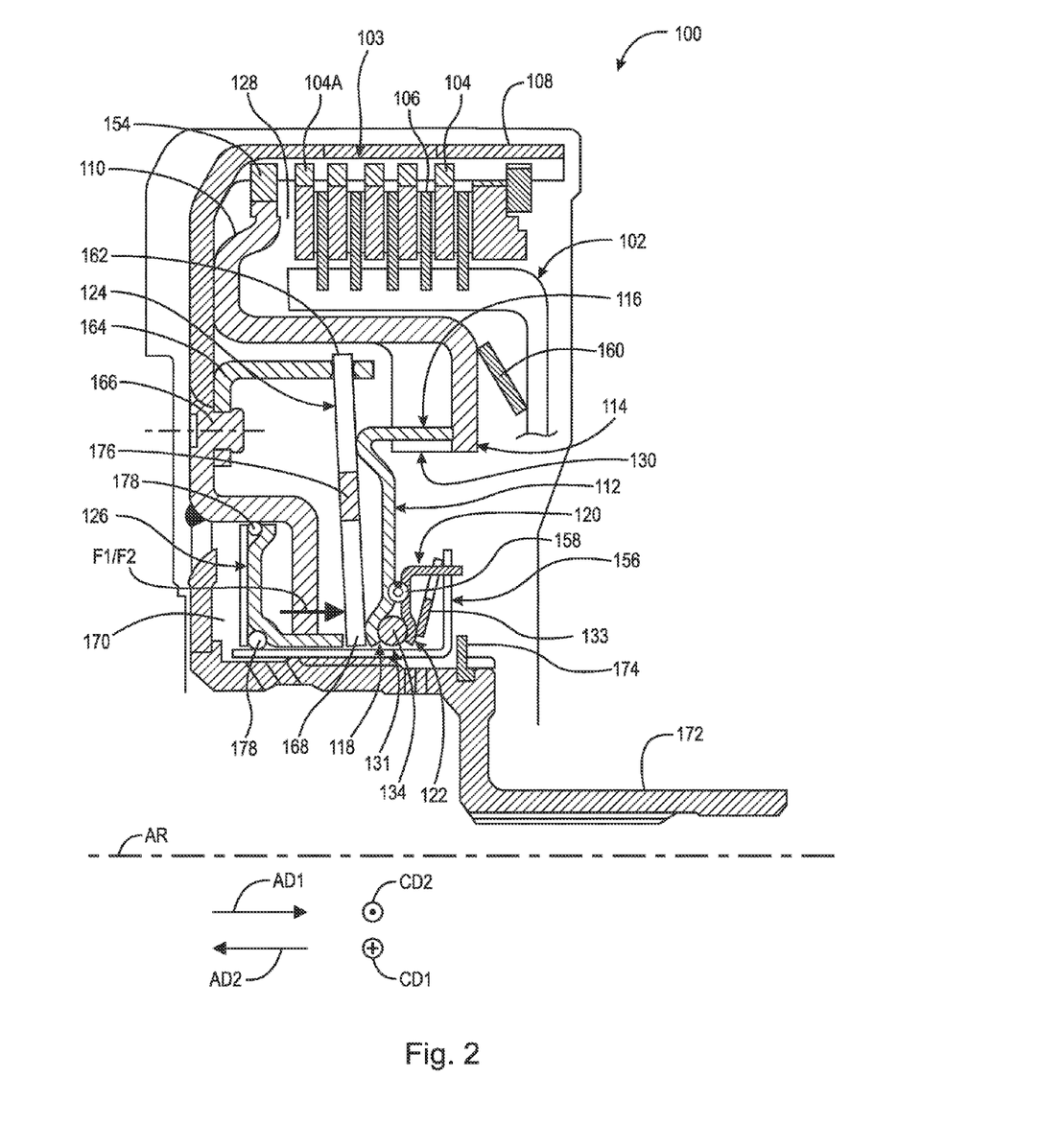

FIG. 2 is a partial cross-sectional view of gap-filling clutch 100 with ramps. Clutch 100 includes inner carrier 102 and clutch pack 103 with pressure plates 104 and friction plates 106. In an example embodiment, plates 104 are non-rotatably connected to housing 108 for a transmission and friction plates 106 are non-rotatably connected to the inner carrier. It should be understood that the preceding configuration can be reversed such that plates 106 are non-rotatably connected to housing 108 and friction plates 104 are non-rotatably connected to the inner carrier. Clutch 100 includes compression plate 110 non-rotatably connected to the housing, and ramp ring 112. Plate 110 includes portion 114. Ramp ring 112 includes portion 116 and portion 118. Portion 116 is in contact with portion 114. Clutch 100 includes ramp ring 120 non-rotatably connected to the housing and including portion 122 axially aligned with portion 118. Clutch 100 includes lever spring 124 and axially displaceable piston 126.

In the open position of FIG. 2, compression plate 110 is free of contact with the clutch pack, for example, the compression plate is separated from plate 104A by gap 128. To close the clutch, the piston is arranged to axially displace the lever spring a first distance in axial direction AD1 such that the lever spring applies force F1 to portion 118 in axial direction AD1 and ramp ring 112 rotates in circumferential direction CD1 (into the page in FIG. 2) and axially displaces in the direction AD1. Ramp ring 112 displaces the compression plate in direction AD1 to contact the clutch pack, for example, plate 104A. This initial displacement of the compression plate quickly closes gap 128. The piston is arranged to further displace the lever spring in direction AD1 applying force F2 to the lever spring. The lever spring causes the compression plate to displace further in direction AD1 such that the pressure plates frictionally engage the friction plates to rotationally fix the inner carrier with respect to the housing.

To open clutch 100, piston 126 is displaced in axial direction AD2, opposite direction AD1, as further described below. As further described below, ramp ring 112 "unwinds" in circumferential direction CD2, opposite direction CD1, and displaces in direction AD2 such that the compression plate moves to the position shown in FIG. 2.

Figure 3A:
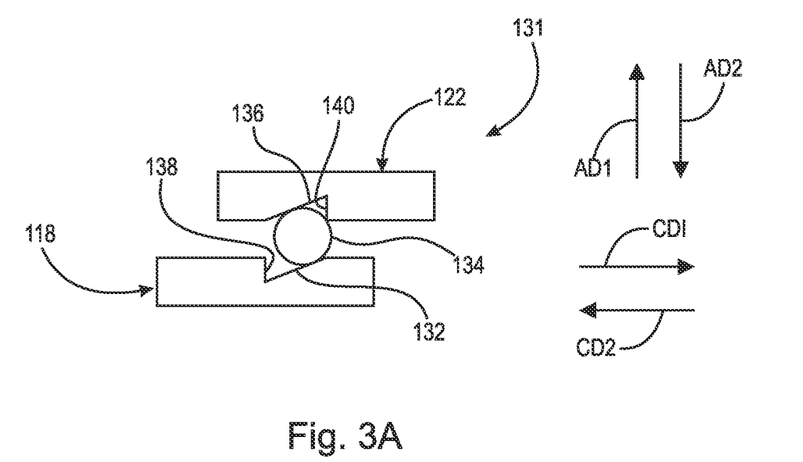
FIGS. 3A and 3B are schematic details showing respective ramp assemblies.
Figure 3B:
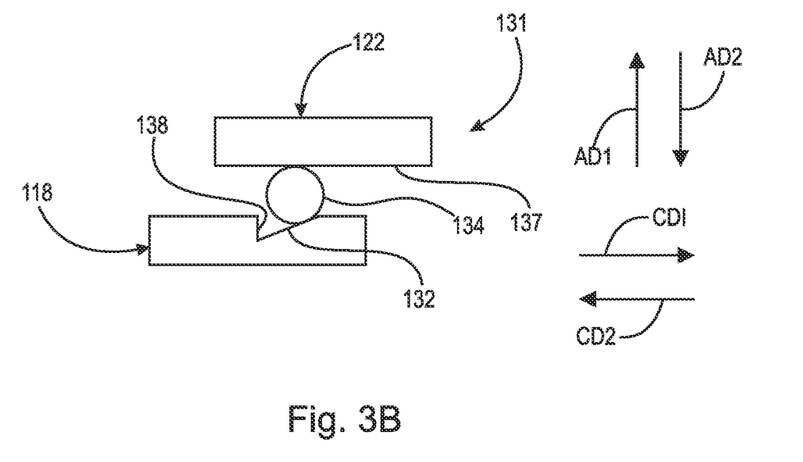

FIGS. 3A and 3B are schematic details showing respective ramp assemblies. The following should be viewed in light of FIGS. 2, 3A, and 3B. It should be understood that FIGS. 3A and 3B are viewing assembly 130 in a radially inward direction. Clutch 100 includes ramp assembly 130 including portions 118 and 122, and ramp assembly 131 including portions 114 and 116. In an example embodiment shown in FIG. 3A, assembly 130 is a sphere/roller and ramp assembly including a plurality of ramps 132 in portion 118, spring 133, a plurality of spheres or rollers 134, and ramps 134 in portion 122. The spheres or rollers are axially disposed between and in contact with ramps 132 and portion 122. In an example embodiment, assembly 130 includes spheres 134. Spring 133 urges portion 122 in direction AD2 to maintain contact between spheres 134 and portions 118 and 122. The functioning of sphere/roller and ramp assemblies is well understood and the following discussion is restricted to the specific function of assembly 130 in clutch 100.

When axial force F1 is applied to portion 118/ramps 132 in direction AD1, ramps 132 rotate in direction CD1 and displace in direction AD1, via displacement (rolling) of spheres 134 along ramps 132 and portion 122/ramps 136. In an example embodiment, assembly 130 is a one-way assembly including walls 138 and 140 defining boundaries of ramps 132 and 136, respectively. The walls prevent ramp ring 112 from displacing in axial direction AD2 as ramp ring 112 rotates in direction CD1.

In an example embodiment shown in FIG. 3B, assembly 130 is a sphere/roller and ramp assembly including a plurality of ramps 132 in portion 118, spring 133, a plurality of spheres or rollers 134, and radial surface 137 in portion 122. The spheres or rollers are axially disposed between and in contact with ramps 132 and portion 122. In an example embodiment, assembly 130 includes spheres 134. Spring 133 urges portion 122 in direction AD2 to maintain contact between spheres 134 and portions 118 and 122. When axial force F1 is applied to portion 118/ramps 132 in direction AD1, ramps 132 rotate in direction CD1 and displace in direction AD1, via displacement (rolling) of spheres 134 along ramps 132 and portion 122/surface 137. In an example embodiment, assembly 130 is a one-way assembly including wall 138 defining a boundary of ramps 132. The wall prevents ramp ring 112 from displacing in axial direction AD2 as ramp ring 112 rotates in direction CD1.

It should be understood that the configuration in FIG. 3B can be reversed such that portion 122 includes ramps 136 and wall 140 and portion 118 includes a radial surface.

Figure 4:
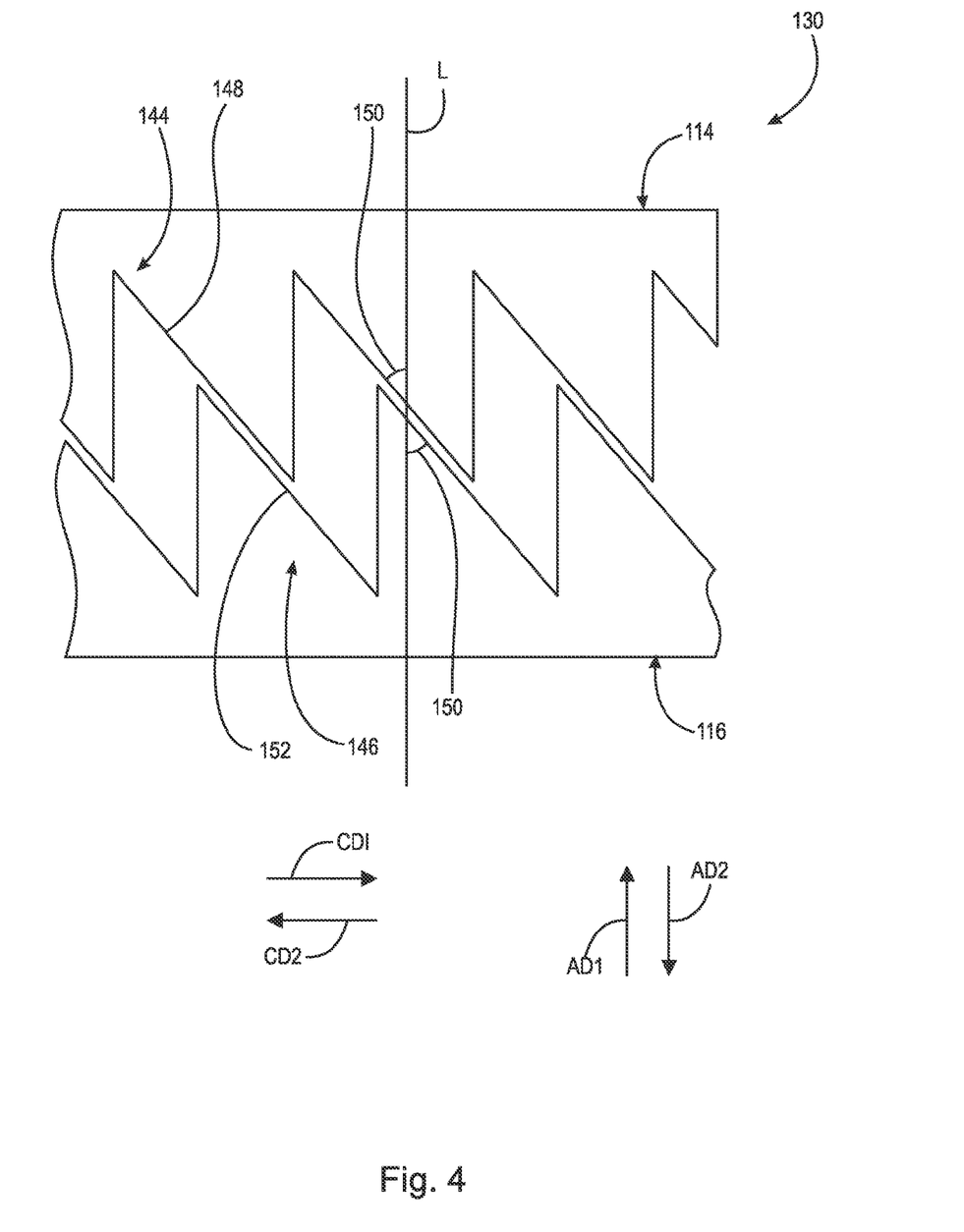
FIG. 4 is a schematic detail showing a ramp assembly.

FIG. 4 is a schematic detail showing a ramp assembly. The following should be viewed in light of FIGS. 2 and 4. It should be understood that FIG. 4 is viewing assembly 130 in a radially inward direction. In an example embodiment, ramp assembly 130 is a "saw tooth" ramp assembly including a plurality of ramps 144 in portion 114 of the compression plate and plurality of ramps 146 in portion 116 of ramp ring 112. The functioning of saw tooth ramp assemblies is well understood in the art and the following discussion is restricted to the specific function of assembly 130 in clutch 100. Ramps 144 include surfaces 148 at acute angle 150 with respect to line L parallel to an axis of rotation AR for the clutch. Ramps 146 include surfaces 152 at acute angle 150 with respect to line L in contact with respective surfaces 148. Surfaces 148 and 152 are shown separated in FIG. 4 to aid in describing the surfaces. Each ramp surface 148 extends progressively further in circumferential direction CD1 along direction AD2 and each surface 152 extends progressively further in a circumferential direction CD2 along direction AD1. When ramp ring 112 rotates in direction CD1 due to axial force F1, as described above, surfaces 152 slide along surfaces 148, forcing surfaces 148 and the compression plate to displace in direction AD1 as described above.

Figure 5:
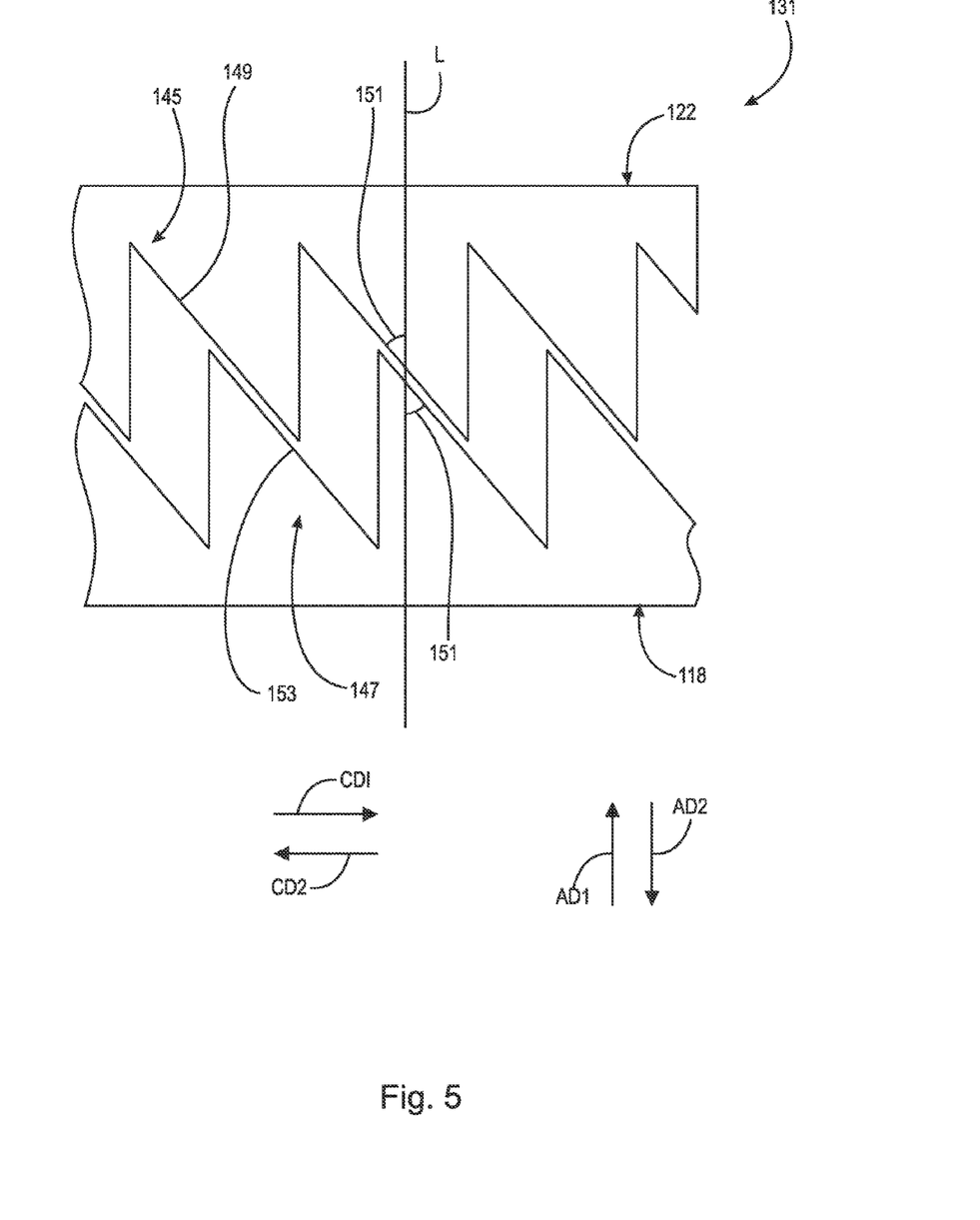
FIG. 5 is a schematic detail showing a ramp assembly.

FIG. 5 is a schematic detail showing a ramp assembly. The following should be viewed in light of FIGS. 2 and 5. It should be understood that FIG. 5 is viewing assembly 131 in a radially inward direction. In an example embodiment, ramp assembly 131 is a "saw tooth" ramp assembly including a plurality of ramps 145 in portion 122 and plurality of ramps 147 in portion 118. Ramps 145 include surfaces 149 at acute angle 151 with respect to line L parallel to an axis of rotation AR for the clutch. Ramps 147 include surfaces 153 at acute angle 151 with respect to line L in contact with respective surfaces 149. Surfaces 149 and 153 are shown separated in FIG. 5 to aid in describing the surfaces. Each ramp surface 149 extends progressively further in circumferential direction CD1 along direction AD2 and each surface 153 extends progressively further in a circumferential direction CD2 along direction AD1. When ramp ring 112 axially displaces in direction AD1 due to axial force F1, as described above, surfaces 153 slide along surfaces 149, forcing surfaces 149 and the ramp ring 112 to rotate in direction CD1 as described above.

It should be understood that directions CD1 and CD2 and the functions associated with directions CD1 and CD2 can be reversed according to the configurations of ramps 132 (and ramps 136), ramps 144 and 146, and ramps 145 and 147.

In an example embodiment, the compression plate is non-rotationally connected to the housing by spline connection 154. In an example embodiment, ramp ring 120 is non-rotatable with respect to the housing via connection to support plate 156, which is rotationally fixed to the housing.

Figure 6:
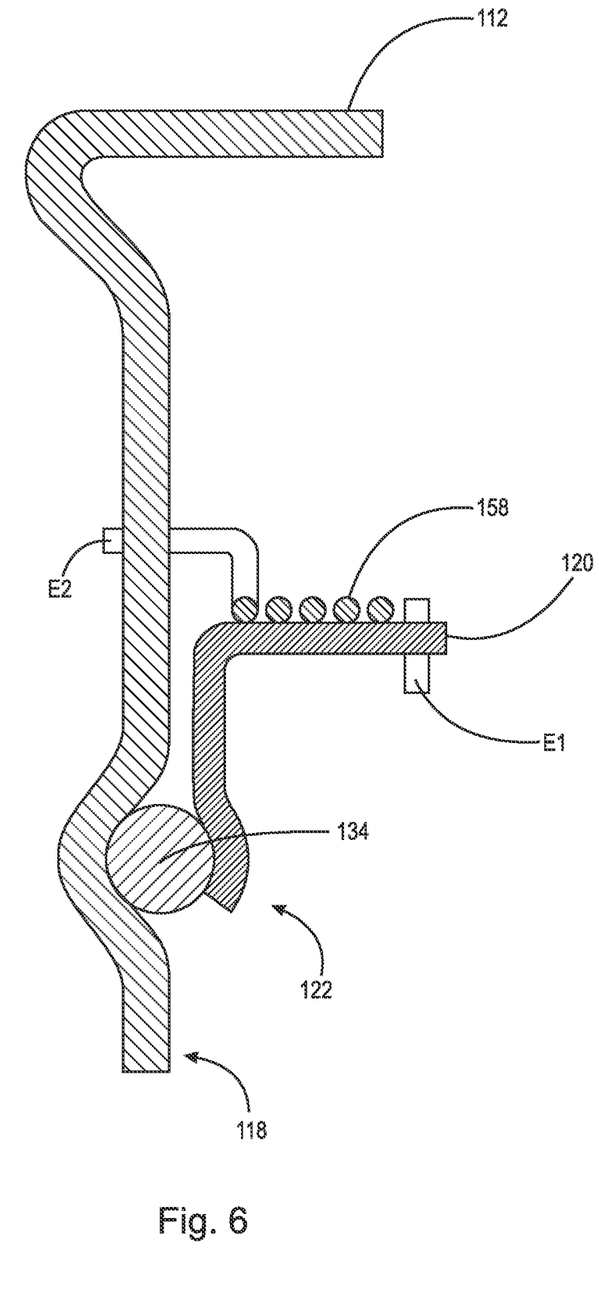
FIG. 6 is a detail showing a counter-spring.

FIG. 6 is a detail showing a counter-spring. The following should be viewed in light of FIGS. 2, 3A, 3B, and 5. In an example embodiment, clutch 100 includes counter-spring 158 urging ramp ring 112 in circumferential direction CD2 with respect to ramp ring 120. Thus, counter-spring 158 opposes the rotation of ramp ring 112 in direction CD1. In FIG. 2, spring 158 is disposed in radially disposed portions of ramp rings 112 and 120, similar to the configuration for a spring in a damper assembly. That is, spring 158 is circumferentially disposed with one end engaged with plate 112 and the other end engaged with plate 120. The spring reacts against plate 120 to urge plate 112 in direction CD2. In FIG. 5, spring 158 is a clock spring with end E1 fixed to plate 120 and end E2 fixed to plate 112.

As noted above, piston 126 is axially displaceable in direction AD2 to open clutch 100. For example, in response to the displacement of the piston (and the reduction of force on ramp ring 112 in direction CD1), and due to assembly 130, counter-spring 158 displaces ramp ring 112 in circumferential direction CD2 and axial direction AD2 with respect to ramp ring 120. Due to ramp assembly 130, compression plate 110 displaces in axial direction AD2 to open the clutch. Due to ramp assembly 131, the lever spring and piston are displaced in direction AD2. Thus, counter-spring 158 repositions or resets clutch 100. In an example embodiment, clutch 100 includes spring 160 urging the compression plate in axial direction AD2 with respect to the inner carrier. Thus, spring 160 ensures that gap 128 is re-established. In an example embodiment, a combined force from springs 158 and 160 displaces piston 126 in direction AD2.

During the displacement of the piston in direction AD1 to apply force F1, portions 116 and 118 move substantially the same respective distances in direction AD1. However, ramp ring 112 enables a mechanical advantage during application of force F2. Ramp ring 112 is sufficiently flexible such that portion 118 moves further in direction AD1 than portion 116 when force F2 is applied, and the relative distances between portions 118 (where the input force is applied from the piston) and 116 (where the output force is applied to the ramp ring) and the fulcrum 162 multiplies force being applied to the compression plate by ramp ring 112. In an example embodiment, the mechanical advantage is 4:1 so that the force being applied to the compression plate by ramp ring 112 is four times F2. The rotation of ramp ring 112 further increases the mechanical advantage since the amount of rotation of ramp ring 112 in direction CD1 is greater than the displacement of ramp ring 112 in direction AD1. In an example embodiment, the combined mechanical advantage is 6.5:1.

The following provides further detail regarding clutch 100 and should be viewed in light of FIGS. 2-6. In an example embodiment, the lever spring is held on its outer pivot diameter (end 162) by plate 164 fixed to the housing, for example, by rivet 166. The lever spring is actuated on its inner pivot diameter (end 168) by hydraulic piston 126. In an example embodiment, the piston is displaced by fluid pressure in chamber 170 at least partially formed by the housing, plate 164 and the piston. Ramp ring 112 fits between the lever spring and the compression plate. Spring 133 is preloaded to urge ramp ring 120 in direction AD2. In an example embodiment, spring 133 is supported by shaft 172, for example, with snap ring 174. To close clutch 100, pressure is applied to the hydraulic piston, causing the piston to press axially (direction AD1) on both end 168 of the lever spring and portion 118 of ramp ring 112. Ramp ring 112 rotates due to assembly 130 and the torque created by the ramps 132 on spheres 134. That is, to relieve the axial pressure, ramps 132 slide over rotating spheres 134 to rotate and axially displace ramp ring 112 as described above.

The rotation of ramp ring 112 causes ramp surfaces 152 to apply force to surfaces 148. To relieve the force, surfaces 152 slide across surfaces 148, displacing the compression plate in direction AD1. As described above, the configuration of clutch 100, and specifically the ramp arrangement, multiplies the movement of piston 126. Thus, a relatively small axial movement of the piston translates into a relatively large axial movement of the compression plate to quickly close gap 128. Once the gap is filled, a load path is in place for the lever spring to directly load the clutch pack. Thus, as pressure is raised behind the hydraulic piston (force F2), the lever spring applies a multiplied force through ramp ring 112, into the clutch compression plate, and into the pressure and friction plates.

After ramp ring 112 has filled gap 1.28, the remaining axial motion of the piston is absorbed by spring 133. As noted above, some distortion of ramp ring 112 is required so that potion 118 can axially displace further than portion 116. This can be accomplished by a flexible design, such as a spoked pattern between portions 116 and 118 including core 176, or by making ramp ring 112 in two parts and connecting the two parts with leaf springs (not shown).

The mechanical advantages and ratios noted above between the hydraulic piston travel and the travel of ramp ring 112 and the lever spring, enable a very small piston and reduced fluid pressure (less force required) to accomplish both the task of closing gap 128 and of creating a large force to securely lock the inner carrier to the housing. Thus, gap 128 is sized for lowest clutch drag without sacrificing shift time. Further, far less hydraulic fluid is used to complete a shift. In the example of FIG. 2, 80% less fluid is used than in a conventional equivalent. The reduction of hydraulic fluid needed may allow the use of a smaller hydraulic pump, further increasing efficiency and reducing cost and size.

In a conventional design, lacking the mechanical advantage of clutch 100, a larger piston area is needed to deliver adequate force to fully close the clutch at the transmissions system pressure. The lift-off gap would be minimized to balance the compromise between clutch drag (maximum gap) and shift time (minimum gap). In clutch 100, such a compromise is unnecessary, as gap 128 provides reduces clutch drag and the design of the ramp rings provides quick response and adequate clamping force.

Figure 7:
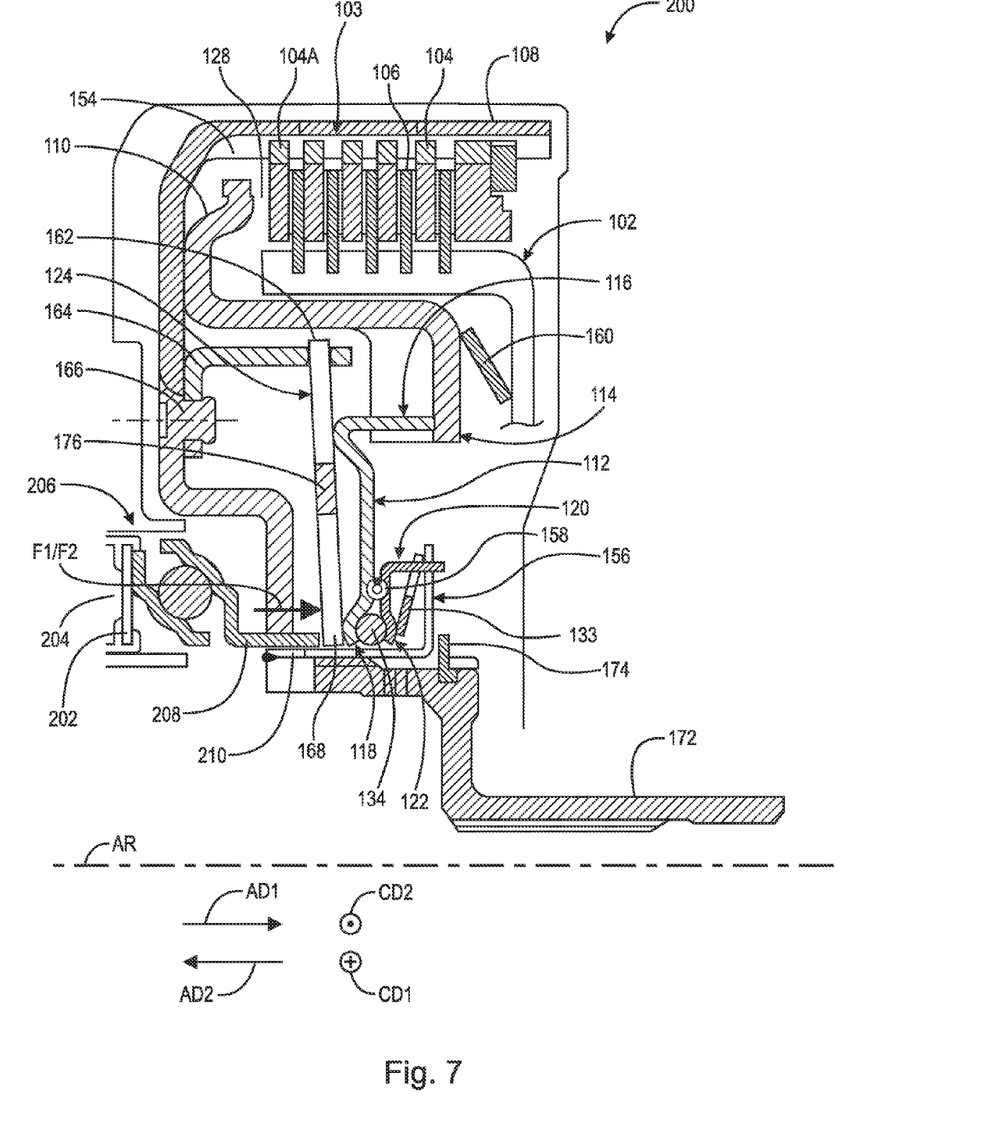
FIG. 7 is a partial cross-sectional view of a gap-filling clutch with ramps.

FIG. 7 is a partial cross-sectional view of gap-filling clutch 200 with ramps. The description of clutch 100 in FIG. 2 is applicable to clutch 200 except as noted. In clutch 200, piston 202 is activated by fluid pressure in chamber 204. For clutch 100, piston 126 rotates. For clutch 200, angular contact bearing 206 is used to enable the use of non-rotating piston 202. The bearing is fitted with fingers 208 on the clutch side, which reach through holes 210 in plate 164. This arrangement enables the clutch carrier to bring torque to shaft 172 while allowing the lever spring to be actuated. Clutch 200 eliminates the need for dynamic seals 178, reduces hydraulic losses, and simplifies the construction of the hydraulic circuits of the transmission housing clutch 200.

The following should be viewed in light of FIGS. 2 through 7. As noted above, clutch drag in an open clutch can cause an undesirable decrease in efficiency, for example, decreasing fuel efficiency for a vehicle using the clutch in a component of the vehicle, such as a transmission. Advantageously, clutches 100 and 200 include gap 128, which prevents the compression plate from applying axial pressure to plates 104 and 106. Due to this lack of axial pressure, gaps between plates 104 and 106 are maximized, reducing clutch drag. As noted above, in some cases, spring 160 is provided to ensure that the compression plate is displaced in direction AD2 to provide gap 128. Note that due to the scale of the drawings, respective gaps between plates 104 and 106 are not readily discernable and may be increased by hydraulic pressure or springs between the plates, for example, to take advantage of the space created by gap 128 and further reduce drag between the plates. In other words, gap 128 may be divided evenly between plates 104 and 106, such that compression plate 110 and pressure plate 104A are proximate one another.

As noted above, the prior art teaches that there are problems associated with increasing gaps between clutch components (increase in response time and fluid needed, plus touch point problems). Advantageously, clutches 100 and 200 eliminate these problems. The mechanical advantage noted above reduces the amount and pressure of fluid needed to operate clutches 100 and 200, while simultaneously providing a smooth and rapid closing of gap 128 (touch point problems eliminated).

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A clutch for a transmission, comprising:
   an inner carrier;
   a clutch pack including:
     plurality of pressure plates non-rotationally connected to one of the inner carrier or a housing for the transmission; and,
     a plurality of friction plates non-rotationally connected to the other of the inner carrier or the housing;
   a compression plate including a first portion;
   a first ramp ring including second and third portions;
   a second ramp ring including a fourth portion;
   a first ramp assembly including:
     the first portion of the compression plate including a first plurality of ramps; and,
     the second portion of the first ramp ring including a second plurality of ramps in contact with the first plurality of ramps;
   a second ramp assembly;
   a lever spring; and,
   an axially displaceable piston,
     wherein:
       the piston is arranged to axially displace the lever spring a first distance in a first axial direction such that:
         the lever spring applies a first force to the third portion in the first axial direction;
         the first ramp ring rotates in a first circumferential direction and axially displaces in the first axial direction; and,
         the first ramp ring displaces the compression plate in the first axial direction to contact a portion of the clutch pack; and,
       the piston is arranged to further displace the lever spring in the first axial direction such that the compression plate displaces further in the first axial direction and the plurality of pressure plates frictionally engages the plurality of friction plates to rotationally fix the inner carrier with respect to the housing; and,
     wherein the second ramp assembly includes:
       the third portion of the first ramp ring including a third plurality of ramps; and,
       the fourth portion of the second ramp ring including a fourth plurality of ramps in contact with the third plurality of ramps; or,
     wherein the second ramp assembly includes:
       the third portion of the first ramp ring including a third plurality of ramps or a first radial surface;
       the fourth portion of the second ramp ring including a fourth plurality of ramps or a second radial surface; and,
       a plurality of spheres or rollers axially disposed between the third and fourth portions and in contact with the third and fourth portions.

2. The clutch of claim 1 wherein the compression plate is non-rotationally connected to the housing.

3. The clutch of claim 1 wherein the second ramp ring is non-rotatable with respect to the housing.

4. The clutch of claim 1, wherein:
   each ramp in the first plurality of ramps includes a first respective surface at an acute angle with respect to a line parallel to an axis of rotation for the clutch; and,
   each ramp in the second plurality of ramps includes a second respective surface at the acute angle with respect to the line parallel to an axis of rotation for the clutch and in contact with a first respective surface.

5. The clutch of claim 4 wherein:
   each first respective ramp surface extends progressively further in the first circumferential direction along a second axial direction, opposite the first axial direction; and,
   each second ramp surface extends progressively further in a second circumferential direction, opposite the first circumferential direction, along the first axial direction.

6. The clutch of claim 1, wherein:
   the second ramp assembly includes:
     the third portion of the first ramp ring including the third plurality of ramps; and,
     the fourth portion of the second ramp ring including the fourth plurality of ramps in contact with the third plurality of ramps;
   each ramp in the third plurality of ramps includes a first respective surface at an acute angle with respect to a line parallel to an axis of rotation for the clutch; and,
   each ramp in the fourth plurality of ramps includes a second respective surface at the acute angle with respect to the line parallel to an axis of rotation for the clutch and in contact with a first respective surface.

7. The clutch of claim 6 wherein:
   each first respective ramp surface extends progressively further in the first circumferential direction along a second axial direction, opposite the first axial direction; and,
   each second ramp surface extends progressively further in a second circumferential direction, opposite the first circumferential direction, along the first axial direction.

8. The clutch of claim 1, wherein:
   the second ramp assembly includes:
     the third portion of the first ramp ring including the third plurality of ramps or a first radial surface;
     the fourth portion of the second ramp ring including the fourth plurality of ramps or a second radial surface; and,
     the plurality of spheres or rollers axially disposed between the third and fourth portions and in contact with the third and fourth portions;
   the second ramp assembly includes a spring arranged to urge the fourth portion in the second axial direction; and,
   the displacement of the third portion in the first axial direction causes the third portion and the plurality of spheres or rollers to rotate with respect to the fourth portion.

9. The clutch of claim 1, further comprising:
   a counter-spring urging the first ramp ring in a second circumferential direction, opposite the first circumferential direction, with respect to the second ramp ring.

10. The clutch of claim 9 wherein the piston is axially displaceable in a second axial direction, opposite the first axial direction such that:
    the counter-spring displaces the first ramp ring in the second circumferential direction with respect to the second ramp ring; and,
    the first ramp ring and the compression plate displace in the second axial direction.

11. The clutch of claim 1 further comprising a spring urging the compression plate in a second axial direction, opposite the first axial direction, with respect to the inner carrier.

12. The clutch of claim 1, wherein the piston is arranged to further displace the lever spring in the first axial direction such that the third portion of the first ramp ring displaces further in the first axial direction than the second portion of the first ramp ring.

13. A clutch for a transmission, comprising:
an inner carrier;
a clutch pack including:
- a plurality of pressure plates non-rotationally connected to one of the inner carrier or a housing for the transmission; and,
- a plurality of friction plates non-rotationally connected to the other of the inner carrier or the housing;

a compression plate;
a first ramp ring;
a second ramp ring non-rotatably connected to the housing;
a first ramp assembly including:
- a first portion of the compression plate including a first plurality of ramps; and,
- a second portion of the first ramp ring including a second plurality of ramps in contact with the first plurality of ramps;

a second ramp assembly including:
- a third portion of the first ramp ring including a third plurality of ramps or a first radial surface;
- a fourth portion of the second ramp ring including a fourth plurality of ramps or a second radial surface; and,
- a plurality of spheres or rollers axially disposed between the third and fourth portions and in contact with the third and fourth portions;

a lever spring;
a first spring urging the first ramp ring in a first circumferential direction with respect to the second ramp ring;
a second spring urging the compression plate in a first axial direction with respect to the inner carrier; and,
an axially displaceable piston, wherein:
when the clutch is open the compression plate is free of contact with the plurality of pressure plates and the plurality of friction plates;
the piston is arranged to axially displace the lever spring a first distance in a first axial direction such that:
- the lever spring applies a first force to the second ramp assembly in the first axial direction;
- the third portion rotates in a first circumferential direction and axially displaces in the first axial direction; and,
- the second portion displaces the compression plate in the first axial direction to contact a portion of the clutch pack;

the piston is arranged to further displace the lever spring in the first axial direction such that the compression plate displaces further in the first axial direction and the plurality of pressure plates frictionally engages the plurality of friction plates to rotationally lock the inner carrier to the housing; and,
the piston is displaceable in the second axial direction such that:
- the first spring displaces the first ramp ring in the first circumferential direction with respect to the second ramp ring; and,
- the first ramp ring and the compression plate displace in the first axial direction such that the compression plate is free of contact with the clutch pack.

14. The clutch of claim 13, wherein:
each ramp in the first plurality of ramps includes a first respective surface at an acute angle with respect to a line parallel to an axis of rotation for the clutch; and,
each ramp in the second plurality of ramps includes a second respective surface at the acute angle with respect to the line parallel to an axis of rotation for the clutch and in contact with a first respective surface.

15. The clutch of claim 13, further comprising a third spring urging the third and fourth portions into contact with the plurality of spheres or rollers.

16. The clutch of claim 13, wherein the piston is arranged to further displace the lever spring in the second axial direction such that the third portion of the first ramp ring displaces further in the second axial direction than the second portion of the first ramp ring.

* * * * *